May 4, 1954  R. M. SHIRK  2,677,602
INTEGRATED CHANNELS AND GRATINGS
Filed April 18, 1951  2 Sheets-Sheet 1

Inventor
Robert M. Shirk
By
B Max ____
Attorney

May 4, 1954  R. M. SHIRK  2,677,602
INTEGRATED CHANNELS AND GRATINGS
Filed April 18, 1951  2 Sheets-Sheet 2

Inventor
Robert M. Shirk
By
Attorney

Patented May 4, 1954

2,677,602

UNITED STATES PATENT OFFICE 2,677,602

INTEGRATED CHANNELS AND GRATINGS

Robert M. Shirk, Wilmington, Del., assignor to Houdry Process Corporation, Wilmington, Del., a corporation of Delaware Application April 18, 1951, Serial No. 221,645

3 Claims. (Cl. 23—288)

This invention relates to the conversion of hydrocarbons, and more particularly to apparatus for introducing a gas to, and removing gas from, a catalyst bed.

At present, one widely-used method of cracking hydrocarbons employs a continuously recycled catalyst which is initially contacted with the hydrocarbons for cracking the same, after which the catalyst is passed to a regenerator for treatment with an oxidizing gas to remove the coke which accumulated thereon during the cracking operation. During regeneration, the catalyst is permitted to gravitate downwardly in bed formation through a suitable vessel while oxidizing gas is passed through it. In order to insure the adequate dispersion of the oxidizing gas through the downwardly moving catalyst bed, the gas may be introduced through a plurality of horizontally disposed inverted channel members which are suitably connected to a supply line and so positioned within the regenerator vessel as to be within the gravitating bed. Apart from the gas introduction zone, appropriate means may be provided for withdrawing the products of combustion resulting from the reaction between the oxidizing gas and the coke, which may be a similar arrangement of horizontally disposed inverted channel members. Further, during the cracking stage wherein the gaseous hydrocarbons are to be cracked with a downwardly moving catalyst bed, the above-mentioned horizontally disposed inverted channel members may be employed to introduce the gaseous hydrocarbons into the bed and also apparatus of this type may be used to remove cracked gaseous hydrocarbons from a catalyst bed.

In apparatus employing the aforementioned horizontally disposed inverted channel members for assisting in distributing and/or collecting gases, the gravitating bed moves downwardly through the passages existing between the channel members and between the channel members and the walls of the vessel. If gas is to be introduced into the downwardly moving bed, it may pass either downwardly and then outwardly from the open bottom of said channel members, or outward through louvers provided in the sides thereof. When the gas is collected from the catalyst bed, it enters the inverted channel members in a manner which is reverse to the distributing process; and may be conducted away from the vessel through a suitable conduit.

In vessels of the instant type, it is necessary, for efficient operation, to have a uniform flow pattern of solids moving downwardly in the vessel, as uneven flow of solids may tend to clog and pack between the various channels past which the solids move. Uneven solids flow also affects unfavorably the flow of gases with resulting channelling, bypassing and/or the like. During the gravitation of the mass of catalyst between the aforementioned channel members, forces may be developed within the mass tending to change the alignment of the channel members, resulting in the disturbance of the flow pattern and the development of the above undesirable defects.

It is the primary object of the present invention to provide constant alignment between inverted channel members employed in distributing or collecting gas in a gravitating catalyst system to thereby improve the flow pattern of the catalyst.

Another object is the provision of gratings between the channel members to keep them in alignment and to further aid in improving the solids flow pattern, as will appear hereinafter.

The foregoing and other objects will become more apparent after referring to the following specification and accompanying drawings wherein like reference numerals designate like parts and wherein.

Figures 1, 2:
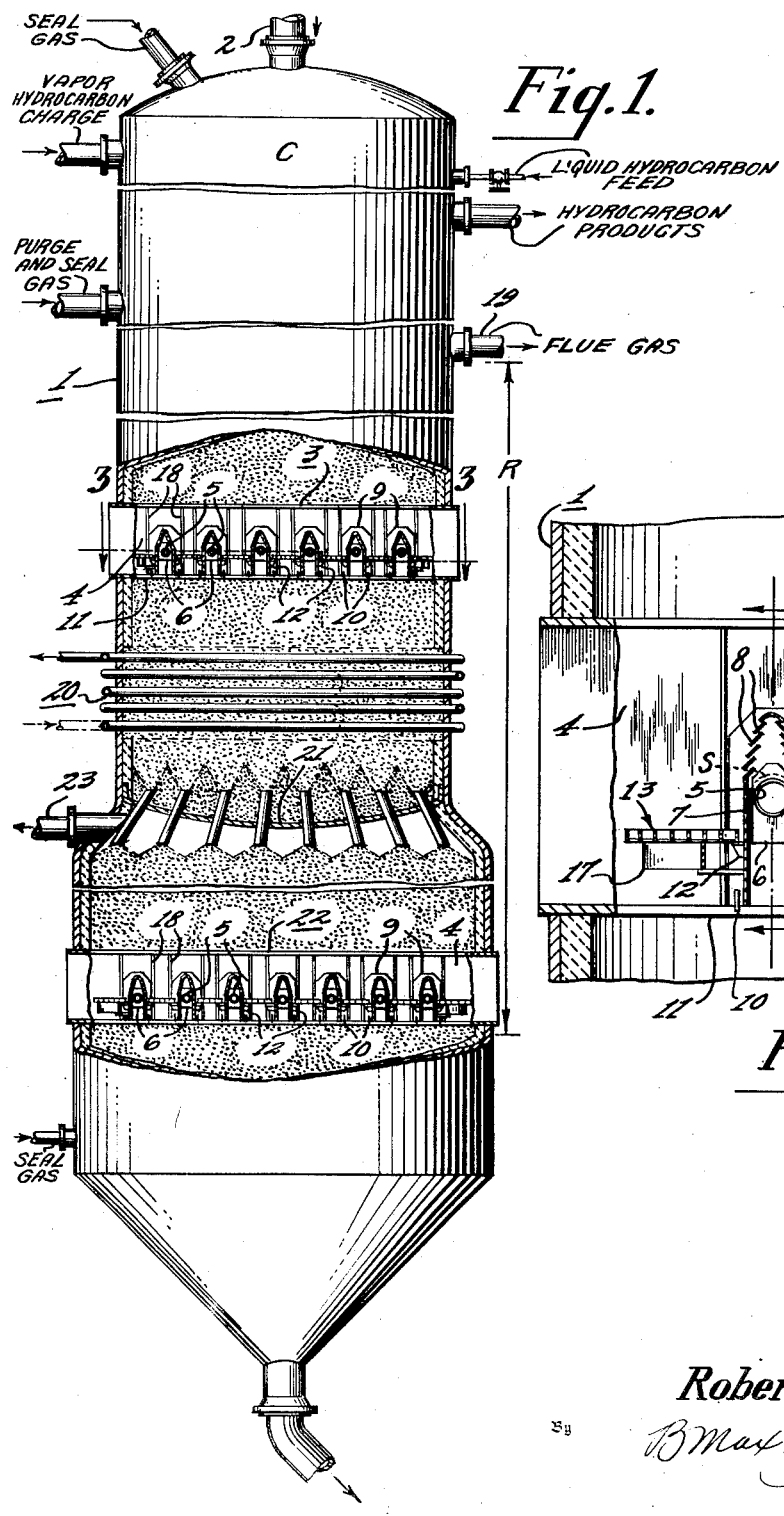
Figure 1 is an elevational view, partly in section, of an apparatus which has been constructed in accordance with the teachings of the present invention, the same comprising a vessel which is provided with a hydrocarbon cracking zone and a catalyst regenerating zone.
Figure 2 is an enlarged fragmentary elevation of a portion of the apparatus of Figure 1.

Referring now more particularly to Figure 1 of the drawings, the numeral 1 designates a reactor vessel having in combination both a cracking section generally indicated at C and a catalyst regeneration section designated generally by R.

The present invention, while adaptable to employment in the cracking stage, will be discussed only in connection with the regeneration stage, it being understood that its employment in the former stage is substantially similar to its use in the regeneration stage and with correspondingly improved results. Further, the invention is equally applicable to systems in which the recycled solids material is non-catalytic in nature, such contact solids supplying heat as required for reaction and/or conversion.

Catalyst is supplied to the reactor vessel 1 through inlet 2 and is formed into a gravitating bed as it moves downwardly through cracking stage C which is suitably supplied with hydrocarbons either in a vapor or liquid phase. Following the cracking process, the catalyst continues to gravitate downwardly in the form of a bed and enters the regeneration section R passing through two successive oxidizing zones, each employing the apparatus of the present invention for introducing the oxidizing gas, preferably air, and for establishing an improved solids flow pattern. Air is introduced countercurrently into the catalyst by means of the apparatus designated generally at 3, the same comprising grating members which will be specifically referred to hereinafter. In describing the specific details of construction of the apparatus 3, reference will be made to Figures 2 and 4 which show enlarged portions thereof. In these figures, the numeral 4 designates a horizontally disposed conduit generally positioned along a diameter of the vessel.

Figure 4:
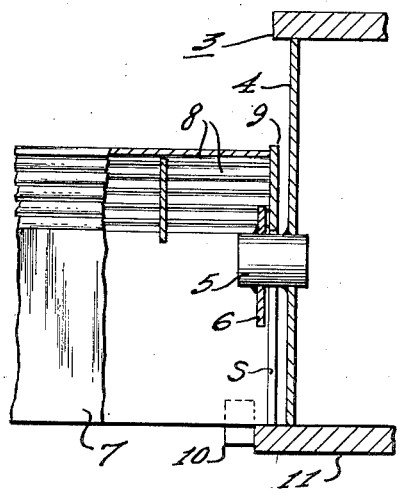
Figure 4 is an enlarged view taken on the line 4—4 of Figure 2.

The conduit 4 is provided with a series of lateral apertures, each of which receives a foreshortened tubular member 5 which projects exteriorly thereof, as shown most clearly in Figure 4. Each of the tubular members 5 carries a plate-like member 6 in outwardly spaced relationship with respect to the conduit 4, the function of which will be later described.

Extending from either side of the conduit 4 is a series of horizontally disposed parallel inverted channel members, each of which comprises a pair of parallel side-walls 7 and an inverted V-shaped top formed by two convergent members 8. Each of the convergent members 8 may be provided with louvers as shown. Each of the channel members is terminated at its end adjacent the conduit 4 by a transverse plate-like member 9 having a slot S extending upwardly therein. Attached to the parallel side-walls 7 of each of the channel members is a lug 10.

According to the foregoing construction and arrangement, the inverted channel members may be removably associated with the conduit 4 by sliding the slots in the plate-like members 9 over the laterally extending tubular members 5.

Undue play of each of the channel members is prevented by the lug 10 which is positioned for contact with the overhanging bottom 11 of the bottom of conduit 4. Attached to the side-walls 7 of the inverted channel members are a plurality of laterally extending lugs 12. Positioned horizontally between said channel members and supported by said lugs 12 are a plurality of gratings 13 which are of such dimensions as to insure relatively complete transverse coverage of the area existing between any two channel members or between an end channel member and the wall of the reactor vessel. In order to enable their cleaning and/or repair, the gratings are preferably removably supported by the lugs 12.

Figure 3:
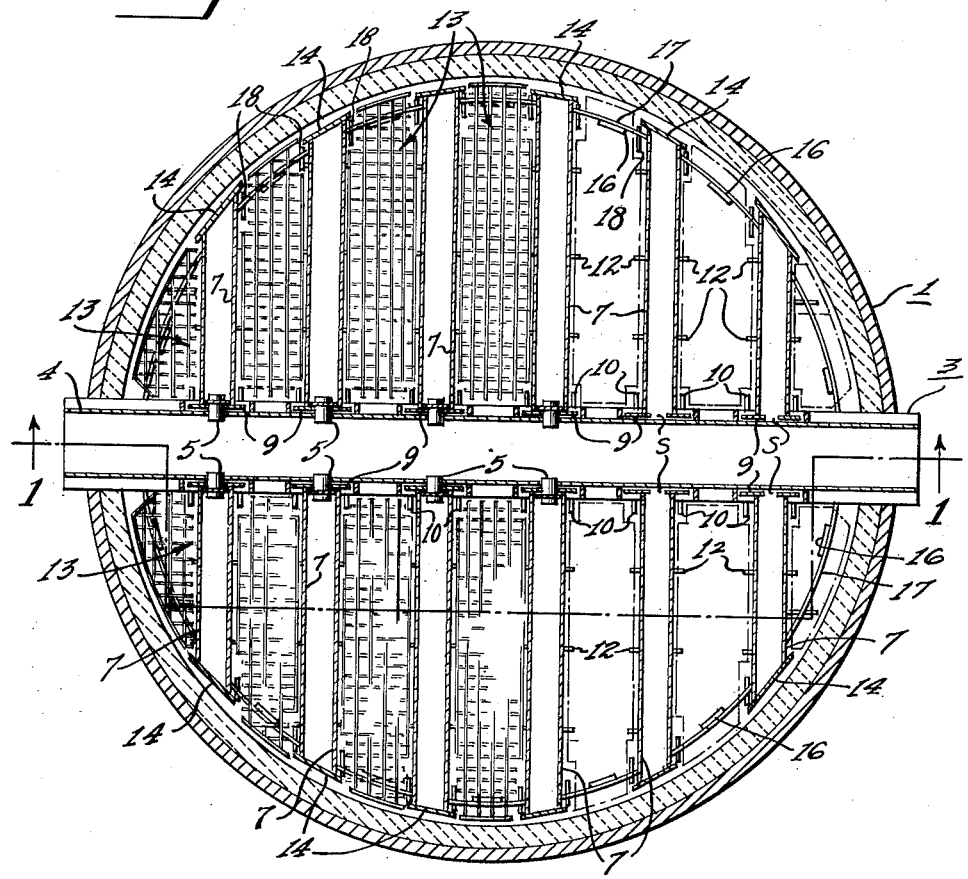
Figure 3 is an enlarged view on the line 3—3 of Figure 1.

Referring now to Figure 3 which, as aforesaid, is an enlarged view on the line 3—3 of Figure 1, the conduit 4 is shown as extending through the sides of the vessel 1 for connection to a suitable source of air.

As shown in Figure 3, the outer ends of the several inverted channel members are closed by transversely extending plate-like members 14.

Permanently attached to the underside of each of the gratings 13 is a lug 16 which engages an adjacently disposed and suitably supported stop member 17. Also provided are grating and channel anti-tilt members 18.

The air introducing apparatus 3 is positioned in the lower end of the first oxidation zone in order that the air will travel upwardly through the gravitating catalyst. As before mentioned, air is supplied to the conduit 4 from a suitable source, the air being dispersed laterally therefrom through the foreshortened tubular members 5 into the inverted channel members formed by the parallel side-walls 7 and convergent members 8. From said inverted channel members, the air passes outwardly through the louvers 8 and disseminates into and through the surrounding gravitating catalyst. In addition, the air may flow downwardly and then laterally from the bottom openings of the channel members. The gravitating catalyst descends through the areas between the inverted channel members and, in doing so, passes through the openings in grating 13.

It is to be noted that the vertical position of the gratings has been established with respect to the channel members such that the gratings are within the distance between the top and bottom of the vertical side-walls of the channel members. This particular position is desirable from the standpoint of pressure drop consideration in that, if the gratings were positioned above the louvers in the converging side-walls of the channels, they would offer impedance to the flow of gases dispersing upwardly from the louvers and result in an undesirable pressure drop.

The disposition of the horizontal gratings 13 between the channel members enables the retention of the relative positions of the latter, thus causing the downwardly moving catalyst to flow in the desired pattern. Further, by permitting the descending catalyst to pass through the gratings, any extraneous matter of such size as may be retained thereon prevents the passage of such larger matter to a lower level, where it could lodge in transfer lines or the like, and thus disrupt the desired uniform flow.

The gas resulting from the regeneration process in the first oxidation zone may be withdrawn from the vessel through outlet 19. After this first oxidation treatment, the catalyst passes through a cooling section provided with suitable cooling coils generally designated at 20, and from this cooling section into the second oxidation zone through a series of downcomers in lateral spaced relation in a supporting tube sheet 21. In this zone, the catalyst is subjected to a second oxidation, air being introduced into the lower end of the zone by means of an apparatus similar to apparatus 3 and designated generally at 22, the products of combustion being removed through outlet 23. Following this second oxidation stage, the regenerated catalyst may be recycled to the cracking zone C.

Prior to the present invention, grating members have been employed to aid the flow pattern of the solids moving through vessels such as disclosed herein. These grating members were generally a complete single unit extending entirely across the vessel and were supported only at their periphery, unless the particular vessel was of large diameter, in which case additional beams were used for supporting the grating across its center.

As a result of the present invention, not only are the relative positions of the channel members retained, but also, by supporting the gratings on the brackets 12 of the channel members, it will be seen that a firmer support is provided than in the case of supporting a single grating as indicated above. Further, by integrating the channel members and gratings at a single level, the height of the vessel is accordingly reduced. Another advantage to be noted is that the grating members with appropriate design serve to carry a greater or less amount of the load or weight of the bed of solids thereabove. This load carrying characteristic has definite advantage when there is positioned below the grating other apparatus which because of structure, purpose or attendant condition such as high temperature is less adapted to the requirement of sustaining any great amount of weight.

In addition to the foregoing advantages, a further advantage accruing from the present invention is that the gratings and channel members are removably held in position so that, if maintenance of any particular piece of equipment is necessary, only those channel members and gratings affected need be removed.

In the foregoing specification and accompanying drawings the apparatus of the present invention has been disclosed as utilized to introduce a gas to a gravitating bed, but it will be understood by those skilled in the art, that said apparatus may be readily adapted to collect gases from the gravitating bed such as the combustion gases from the regeneration process.

Various other modifications may be made without departing from the spirit or scope of the instant invention which is intended to be limited only by the following claims.

I claim:

1. Apparatus for engaging and disengaging gas in a reaction vessel having a downwardly moving catalyst bed, comprising a plurality of horizontally disposed inverted channel members removably connected to a laterally ported common conduit, and a grating disposed between each of said channel members, said grating being adapted to maintain said channel members in alignment during downward movement of said catalyst bed, said grating being removably supported by said channel members.

2. An apparatus for introducing a gas to a reaction vessel having a downwardly moving catalyst bed, comprising a plurality of horizontally disposed inverted channel members connected to a supply conduit, each of said channel members having a top formed by two converging side-walls extending angularly from the vertical side-walls thereof, said converging side-walls having louvers therein, and a grating between said vertical side-walls of each adjacent channel member, said gratings being adapted to maintain said channel members in alignment during downward movement of said catalyst bed, said gratings being supported between said channel members by lugs which extend laterally from the vertical sides of said channel members.

3. Apparatus for engaging and disengaging gas in a reaction vessel having a downwardly moving bed of contact solids, comprising a plurality of horizontally disposed inverted channel members connected to a common conduit, and gratings horizontally positioned between adjacent channel members and between flanking channel members and the wall of said vessel, said gratings operating to maintain said channel members in alignment during downward movement of said bed while insuring relatively complete transverse coverage of the area existing between said channel members and said flanking channel members and said wall, said gratings being removably supported by lugs extending laterally from said channel members and from said flanking channel members and said wall.

References Cited in the file of this patent

UNITED STATES PATENTS

| Number | Name | Date |
| --- | --- | --- |
| 2,458,358 | Evans | Jan. 4, 1949 |
| 2,460,151 | Sinclair | Jan. 25, 1949 |
| 2,468,468 | Sinclair et al. | Aug. 26, 1949 |
| 2,562,903 | Fontana | Aug. 7, 1951 |